US005961767A

United States Patent [19]

Aksyuk et al.

[11] Patent Number: 5,961,767

[45] **Date of Patent: *Oct. 5, 1999**

[54] METHOD FOR FORMING MICRON-SIZED AND SMALLER LIQUID DROPLETS

[75] Inventors: Vladimir A. Aksyuk, Piscataway; David J. Bishop, Summit; Winfried Denk, Berkeley Heights; David W. Tank, Morristown, all of N.J.

[73] Assignee: Lucent Technologies, Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/856,566

[22] Filed: May 15, 1997

[51] Int. Cl.[6] .................................. B05D 3/02; C09J 5/00

[52] U.S. Cl. ....................... 156/257.5; 427/516; 427/559; 427/58; 427/256; 156/305; 156/91; 29/622; 29/874; 29/877; 29/458

[58] Field of Search .................................... 427/510, 516, 427/559, 58, 256, 372.2; 222/420; 118/401; 156/305, 308.6, 275.5, 91, 275.7; 29/622, 458, 527.2, 874, 877, 11

[56] References Cited

U.S. PATENT DOCUMENTS

| | | | |
|---|---|---|---|
| 3,828,987 | 8/1974 | Drummond et al. | 222/386 |
| 3,883,044 | 5/1975 | Buchler et al. | 222/309 |
| 5,053,100 | 10/1991 | Hayes et al. . | |
| 5,456,797 | 10/1995 | Weber et al. | 437/67 |
| 5,486,337 | 1/1996 | Ohkawa . | |
| 5,507,872 | 4/1996 | Antenucci et al. . | |
| 5,601,980 | 2/1997 | Gordon et al. | 435/6 |
| 5,643,628 | 7/1997 | Sonderegger | 427/2.31 |
| 5,669,997 | 9/1997 | Robbert et al. | 156/101 |

FOREIGN PATENT DOCUMENTS

| | | |
|---|---|---|
| 0 306 200 | 3/1989 | European Pat. Off. . |
| 0 510 629 A1 | 10/1992 | European Pat. Off. . |
| 0 523 589 | 1/1993 | European Pat. Off. . |

OTHER PUBLICATIONS

Pister et al., "Microfabricated Hinges," v. 33, Sensors and Actuators A, pp. 249–256, 1992.

*Primary Examiner*—Shrive Beck
*Assistant Examiner*—Michael Barr

[57] ABSTRACT

A method for forming micron-sized or smaller drops of liquid, and the use of the method in fabricating micro electro mechanical and micro mechanical devices is disclosed. A micropipette is formed having an inside diameter no larger than the size of the drops to be formed. The micropipette is connected to a system capable of developing a positive and optionally negative pressure within the micropipette. The tip of the micropipette is placed in liquid. The liquid is drawn into the micropipette via capillary action or from the negative pressure developed by the system. The micropipette is then positioned to deliver liquid to an intended location on a surface. To deliver the liquid, a positive pressure is developed within the micropipette. The positive pressure forces a micron-sized or smaller drop of liquid out of the micropipette. The method can be used to form micron-sized or smaller drops of adhesive for fixing in place various structural members that form microdevices.

14 Claims, 5 Drawing Sheets

METHOD FOR FORMING MICRON-SIZED AND SMALLER LIQUID DROPLETS

FIELD OF THE INVENTION

The present invention relates generally to a method for forming micron-sized and smaller liquid droplets.

BACKGROUND OF THE INVENTION

Assembling micro mechanical devices often requires attaching micron-scale objects to one another. It would be convenient to attach such devices by gluing them together. Gluing objects of such scale, however, is problematic.

When applying glue, it is preferable, if not necessary, to deliver the glue in precise amounts to precise locations, have reasonable working time and restricted flowability to other regions. Drops of glue tend, however, to assume a size that is disadvantageously typically several orders of magnitude larger than the typical micro mechanical device. Moreover, even if there was a method for delivering suitably small drops of glue, such small drops of glue tend to have a short working time because the glue's solvent rapidly evaporates due to the large surface area to volume ratio.

Thus, there is a need for a method for gluing such micron-scale objects.

SUMMARY OF THE INVENTION

In a method according to the present invention, a micropipette, typically used for biological experiments, is used to form and apply micron-sized and smaller glue drops. The micropipette is attached to a vacuum/pressurization system for wicking up/delivering the adhesive. Low viscosity, ultraviolet light (UV) curable epoxies are preferably used, which provide working times of several hours for the glue drops. Micromanipulator are used to deliver the micropipette, and hence a glue drop, to the desired location. The epoxy is cured by exposing it to UV. Such micron-sized and smaller glue drops can advantageously be used to fabricate micro mechanical and micro electro mechanical structures. Microchannels can be formed in such microstructures to deliver glue to locations having limited access.

BRIEF DESCRIPTION OF THE DRAWINGS

Further features of the invention will become more apparent from the following detailed description of specific embodiments thereof when read in conjunction with the accompanying drawings, in which.

DETAILED DESCRIPTION

The present invention is directed to a method for forming micron-sized and smaller drops of liquid. The method is described in the context of forming glue drops for the assembly of micro-sized structures. Glue drops for forming such structures will preferably have a size in the range from about 0.6 microns to about 20 microns. It should be understood, however, that the present invention is more broadly applicable. For example, the present method can be used to form micro lenses.

Figure 1:
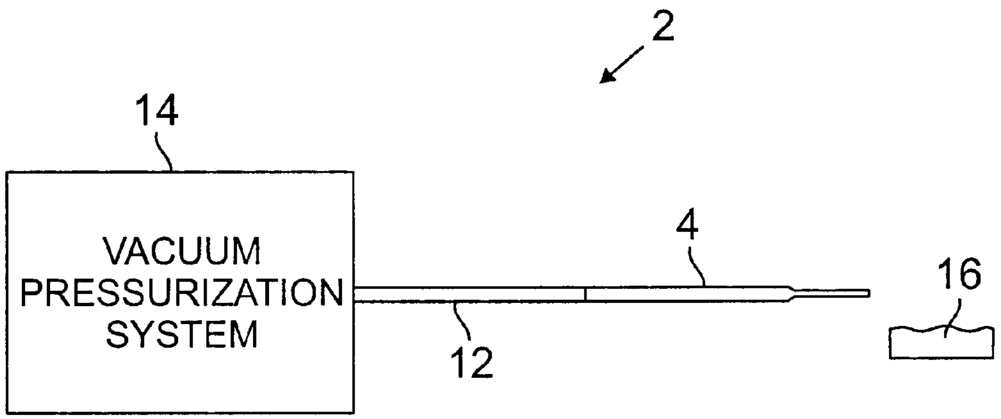
FIG. 1 shows an arrangement suitable for delivering micron-size or smaller glue drops.

FIG. 1 shows an exemplary arrangement 2 suitable for practicing the present method. The arrangement includes a micropipette 4, a vacuum/pressurization system 14, means 12 for interconnecting the micropipette and the vacuum/pressurization system, and an adhesive 16.

Figure 2:
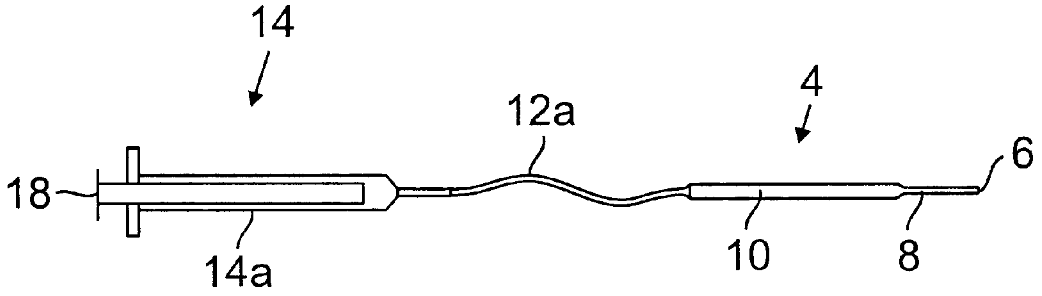
FIG. 2 shows an exemplary embodiment of a vacuum/pressurizing system.

In a basic implementation shown in FIG. 2, the vacuum/pressurization system 14 is a syringe **14*a* having plunger 18. It will be appreciated that other more sophisticated vacuum/pressurization systems 14 can be used. Means 12 can be rubber tubing 12*a*** or the like capable of withstanding slight negative and positive pressures.

Capillary effect may be sufficient to wick the adhesive 16 into the micropipette 4. In preferred embodiments, a slight negative pressure is developed through the arrangement 2 to facilitate wicking up the adhesive 16. If the vacuum/pressurization 14 is implemented as a syringe **14*a*, drawing the plunger 18 partially out of the syringe 14*a* will develop a negative pressure suitable for wicking up the adhesive 16. To deliver the adhesive 16 from the micropipette 4, the plunger 18 is pushed into the syringe 14*a* thereby generating a positive pressure suitable for forcing the adhesive 16** out of the micropipette.

The micropipette 4 includes a tip 6, tapered neck 8 and body 10. The inside diameter of the micropipette 4 will typically be in the range of about 500 angstroms to tens of microns, as a function of the desired size of the glue drop. Micropipette 4 suitable for use in conjunction with the present invention can be made using commercially available micropipette pullers, such as available from U.S. Narishige International, Inc., East Meadow, N.Y. Such a micropipette puller is suitable for producing a micropipette having a mouth less than about 0.1 micron in diameter. A pipette grinder, also available from U.S. Narishige International Inc., can be used to grind the tip 6 of the micropipette 4 back, increasing its diameter as desired. The diameter of the tip 6 of the micropipette should be no larger, and preferably slightly smaller, than the desired drop size.

Adhesives 16 suitable for use in conjunction with the present invention include heat curable, and, more preferably, UV curable glues. One suitable UV-curable glue is Norland Optical Adhesive no. 81, available from Norland Products Inc. of New Jersey. Adhesive should be selected to provide an appropriate working time during which the adhesive does not solidify, dry out, or become appreciably more viscous. Norland Optical Adhesive no. 81 may be used in conjunction with the present invention for forming micron-sized lenses, as well.

Additionally, the adhesive 16 should be homogeneous on a submicron scale so that no phase separation takes place as the micropipette 4 is filled with adhesive. For example, some conductive epoxies contain metal particles having a size in the range of from about 1 to 10 microns. Such particles may be larger than the internal diameter of the micropipette 4. Such an adhesive should not be used.

The time required to wick-up and deliver adhesive 16 is a function of applied pressure differential and adhesive viscosity. A relatively higher adhesive viscosity results in relatively longer wick-up and delivery time. A viscosity of 300 centipoise has been found to provide suitably short wick-up/delivery times for reasonable applied pressure differences, e.g., less than about one atmosphere.

Figure 3:
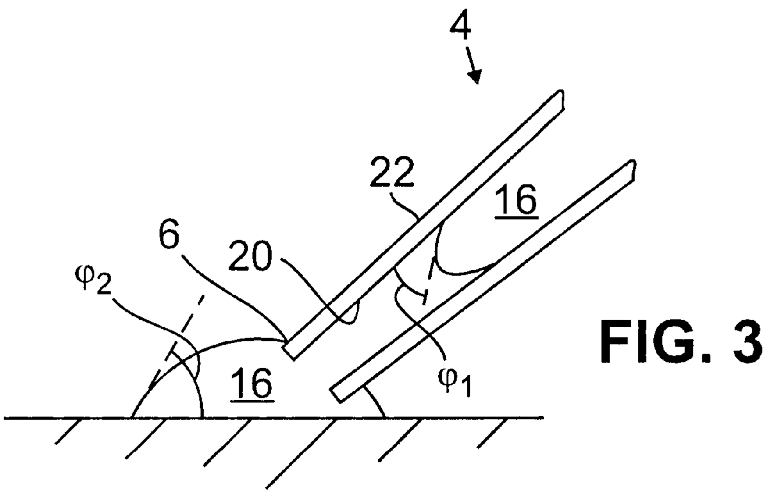
FIG. 3 shows an exemplary micropipette.

With reference to FIG. 3, a further consideration in adhesive selection is the contact angle $\phi_1$ between the adhesive 16 and the interior surface 20 of the micropipette 4. The contact angle $\phi_1$ is determined by properties of both the adhesive 16 and the interior surface 20. In preferred embodiments, the contact angle $\phi_1$ should be less than about 90°. It has been found that at contact angles greater than about 90°, unsuitably high pressure differentials are required to wick-up the adhesive 16 into the micropipette 4. In less preferred embodiments, selection of a particular micropipette inner diameter d and particular contact angle $\phi_1$ may require external pressurization to wick-up the adhesive.

For a contact angle $\phi_1$ less than 90°, any adhesive 16 in contact with the tip 6 that is not drawn within the micropipette 4 tends to spread up the outer surface 22 of the micropipette. Thus, glue does not remain outside the micropipette 4 in the vicinity of the tip 6. As such, adhesive is not deposited during unintended surface contacts unless the micropipette 4 is positively pressurized.

For a contact angle $\phi_1$ less than 90°, a finite positive pressure differential ΔP between the interior of the micropipette 4 and the surroundings is required to start delivery of the adhesive 16 from within the micropipette. The positive pressure differential ΔP is required to overcome a capillary effect that tends to keep the adhesive 16 within the micropipette 4. The positive pressure differential ΔP is a function of the contact angle $\phi_1$, surface tension σ of the adhesive 16, and the inner diameter d of the micropipette 4 as follows:

$$\Delta P=(4\sigma/d)\cos\phi_1 \quad [1]$$

It will be appreciated from expression [1] that as the contact angle $\phi_1$ or inner diameter d of the micropipette decreases, the pressure differential ΔP increases.

Expression [1] is based on delivering the adhesive through a regular-shaped, i.e., circular, tip 6. If the tip shape is irregular or otherwise differs from a circle, then the pressure differential required to overcome the capillary effect should decrease. As such, expression [1] should provide a conservative estimate of the required pressure differential. Moreover, it should be understood that the present description pertains to delivering the adhesive liquid to a surface, as opposed to another liquid, or into air.

Selection of adhesive 16 is also influenced by characteristics of the surface upon which the adhesive is to be deposited. Those characteristics result in a particular contact angle $\phi_2$ between the adhesive and that surface. The contact angle $\phi_2$ should be greater than zero, otherwise the adhesive 16 will spread over the surface, rather than remaining contained as a submicron-sized drop. Moreover, $\phi_2$ should be less than $\phi_1$ to minimize the tendency for the adhesive 16 to spread along the outer surface 22 of the micropipette 4 in preference to remaining at the intended delivery site. A combination of adhesive 16, micropipette 4 and target surface resulting in a value of about 60° for $\phi_1$ and a value of about 30° for $\phi_2$ has been found to be suitable for practicing the present invention.

To avoid limitations on adhesive selection imposed by the surface characteristics of the outer surface 22 of the micropipette 4, the outer surface 22 can be coated with a material that a results in a contact angle $\phi_3$ between the adhesive and the coating on the outer surface 22. If the contact angle $\phi_3$ is greater than $\phi_1$, then the aforementioned condition $\phi_2<\phi_1$ may be relaxed, and the requirement now becomes $\phi_2<\phi_3$.

Figure 4:
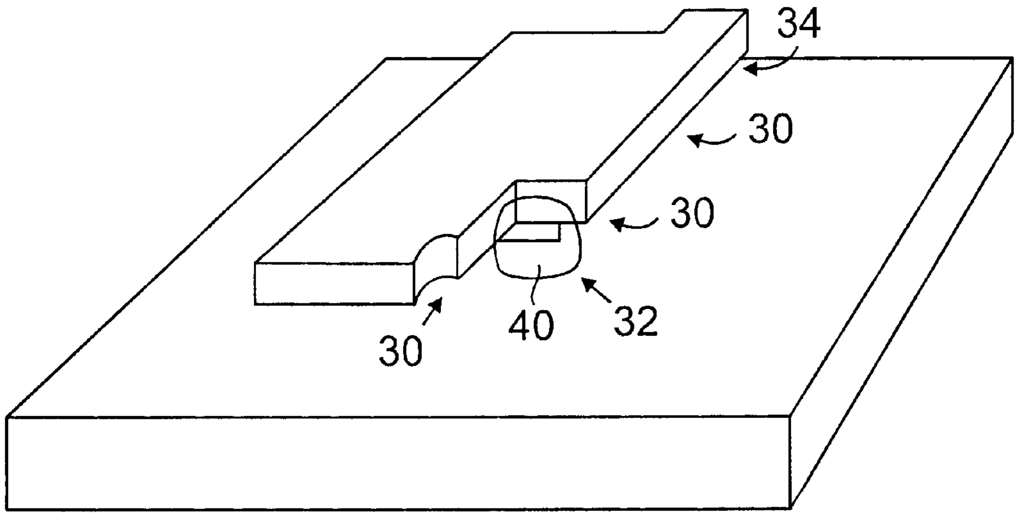
FIG. 4 shows microchannels for adhesive delivery.

As shown in FIG. 4, a channel-forming member 31 for forming a microchannel 30 can be incorporated into micro-sized structures. A micron-sized adhesive drop 40 delivered at site 32 will spread, via capillary action, through the microchannel 30 to site 34. In this manner, a drop 40 can be deposited a safe distance away from delicate structures and delivered to a desired location via a microchannel. Such a microchannel 30 advantageously relaxes drop size requirements and facilitates delivery of adhesive 16 to locations that are (i) inaccessible to the micropipette 4, and (ii) too close to delicate structures to risk direct delivery of adhesive from the micropipette.

Figure 5:
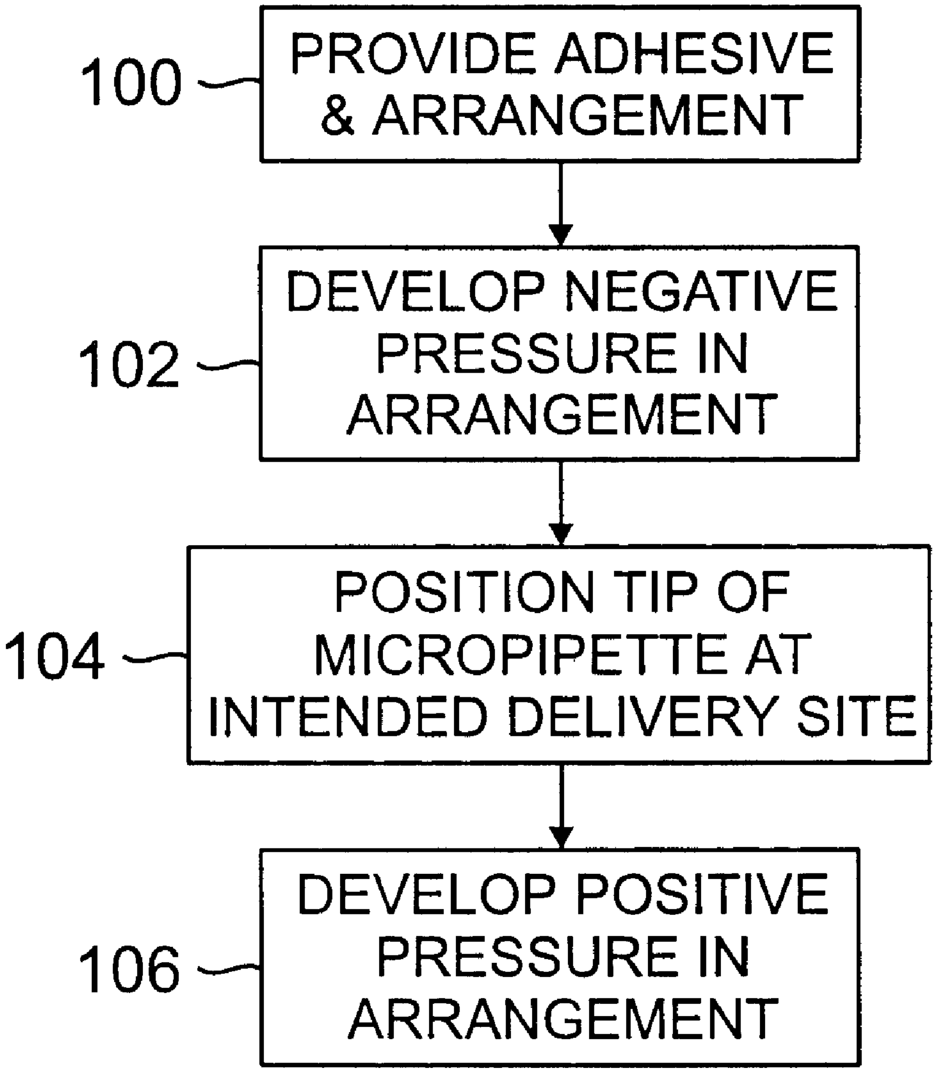
FIG. 5 is a flow diagram of a method according to the present invention for delivering submicron-sized glue drops.

FIG. 5 shows a flow diagram of a method according to the present invention, wherein, in operation block 100, an adhesive, and an arrangement suitable for wicking-up the adhesive and delivering micron-sized and smaller drops of the adhesive, is provided. As indicated in optional block 102, a negative pressure is developed in the arrangement to draw adhesive therein. Developing negative pressure is optional, in some cases, since capillary action may be sufficient to wick up the adhesive. The tip of the arrangement is positioned at the intended site for adhesive delivery as indicated in operation block 104. Micromanipulators can be used for such purpose. A positive pressure is developed in the arrangement to force the adhesive out to the intended site, as noted in block 106. The adhesive is then cured, typically by UV or heat exposure. In further embodiments, micro channels can be provided in an object for which the adhesive is intended to facilitate delivering adhesive to a desired location.

Figure 6:
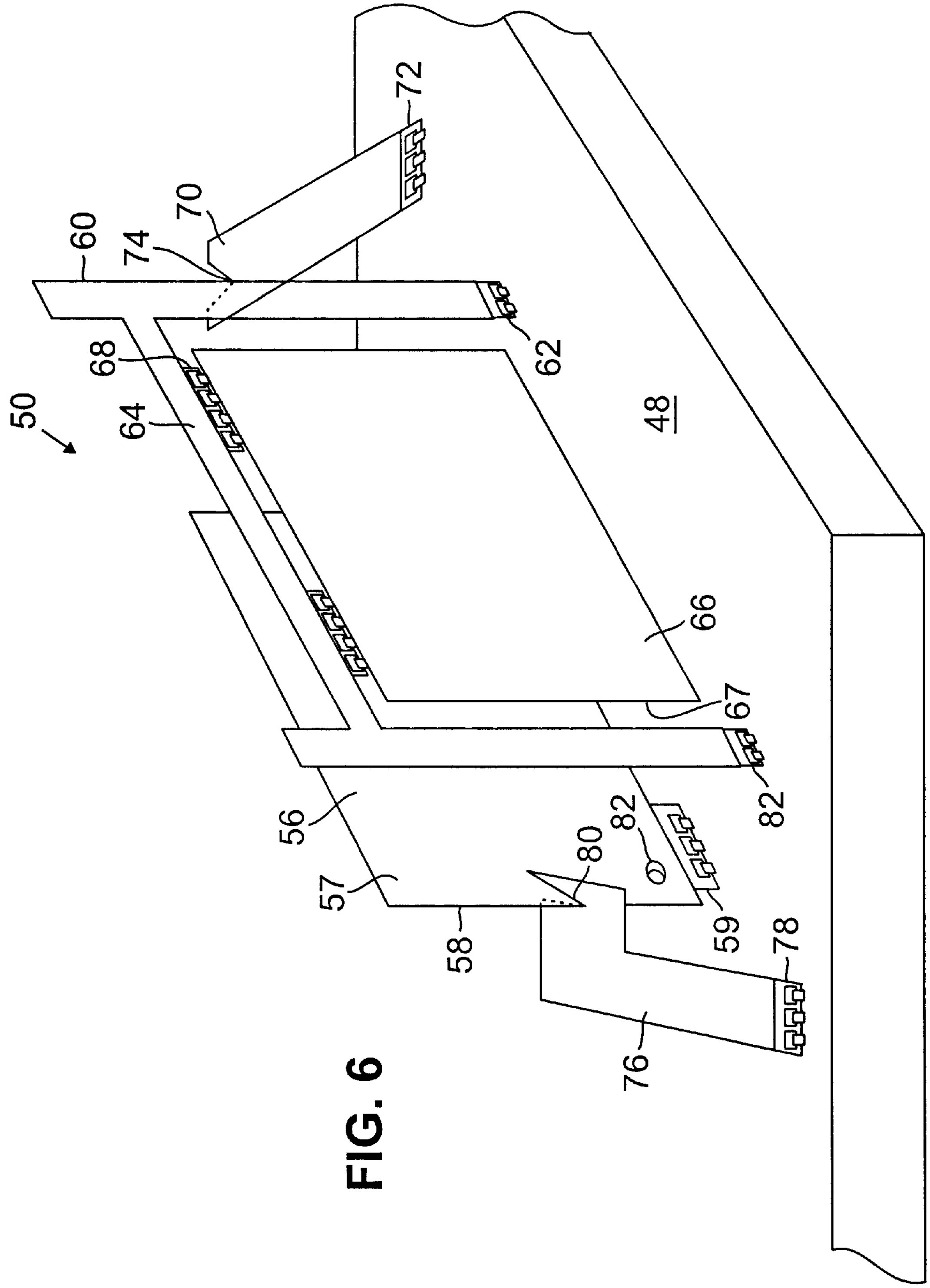
FIG. 6 shows a micro electro mechanical systems (MEMS) device that is assembled using micron-sized or smaller glue drops formed according to the present method.

FIG. 6 shows an exemplary micro electro mechanical systems (MEMS) device 50 that is fabricated using submicron-sized drops of adhesive. The MEMS device 50 shown in FIG. 6 is a hinged-plate actuator. Such an actuator, and its use in optical switches, is described in copending patent application Ser. No. 08/856,569, entitled MICRO MACHINED OPTICAL SWITCH, filed on even date herewith and assigned to the present assignee. The aforementioned patent application is incorporated by reference herein. It will be appreciated that the present method can be applied advantageously to a variety of other MEMS structures.

The MEMS device 50 is formed from a plurality of hinged plates 56, 60, 66, 70 and 76. To assemble the MEMS device 50, the various hinged plates, which are typically photo lithographically patterned in the plane of substrate 48, are rotated to an out-of-plane position such as shown in FIG. 6. Hinges 59, 62, 72 and 78 allow the plates to rotate. Hinged plate 70 receives hinged plate (frame) 60 in notch 74. Plate 66 is suspended from cross member 64 of the frame 60 in a manner that allows plate 66 to swing freely. In the embodiment of FIG. 6, hinges 68 provide that function. Plate 66 functions as a movable electrode. Hinged plate 76 receives edge 58 of hinged plate 56 in notch 80. The hinged plate 56 functions as a fixed electrode.

As a voltage is applied across the hinged plates 56 and 66, an electrostatic force is developed that causes the movable hinged plate 66 to swing in a substantially horizontal path towards the hinged plate 66. The substantially horizontal displacement of the hinged plate 66 can be imparted to a linked object, via a linkage, not shown, causing the linked object to move.

To prevent the movable electrode 66 and the fixed electrode 56 from shorting, dielectric stops 82 are disposed near the lower corner edges of one or both of the surfaces 57, 67 of respective electrodes 56 and 66. A single stop 82 is visible in FIG. 6. The stops 82 may be micron-sized drops of adhesive formed and delivered according to the present method. A drop of adhesive about 5 microns in diameter has been found to be suitable for forming the stops 82. Moreover, micron-sized drops of adhesive can be applied to the hinges 59, 62, 72 and 78 to aid in fixing the various hinged plates in their desired out-of-plane position.

Figure 7:
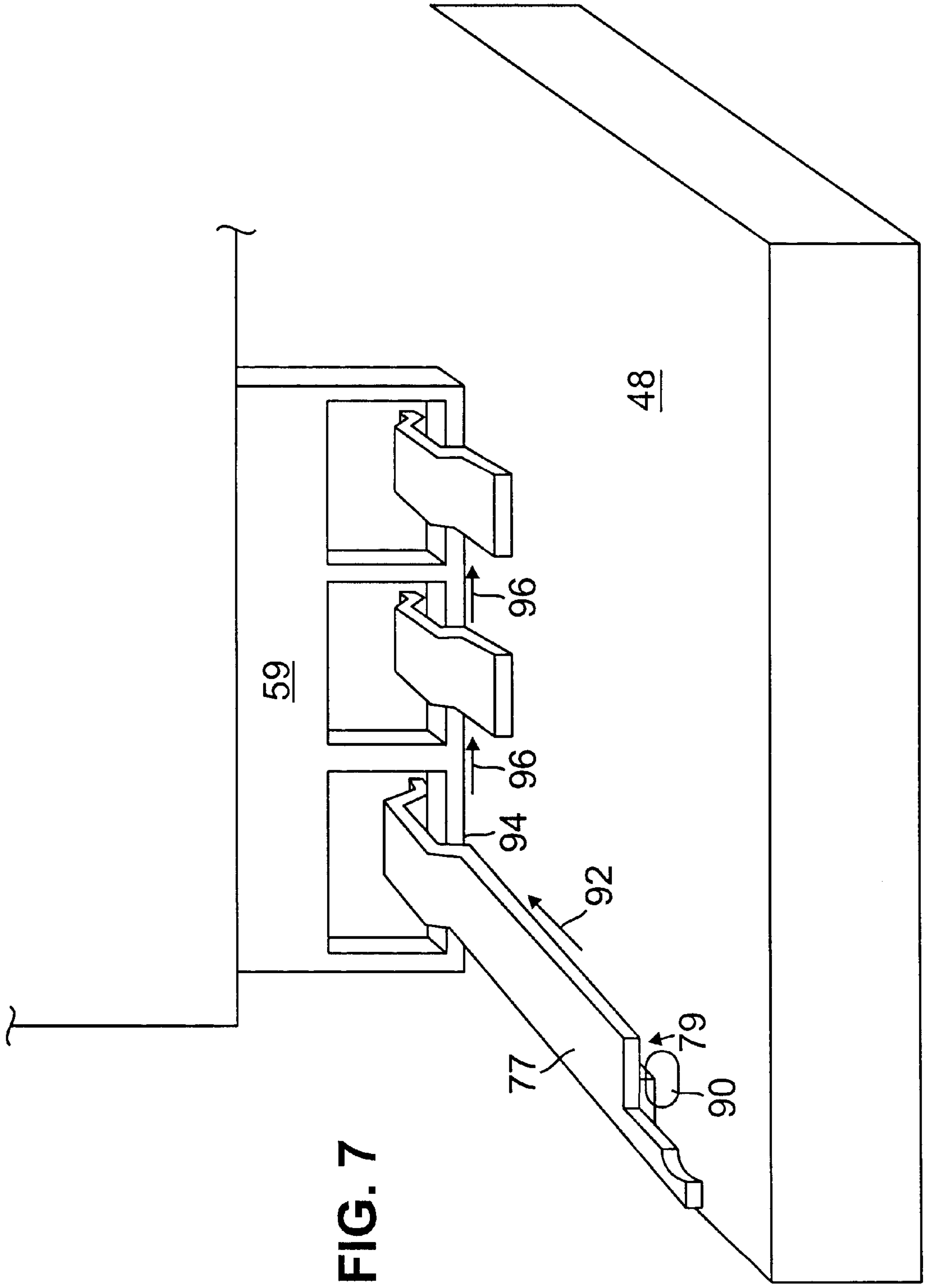
FIG. 7 shows a channel-forming membrane on a support to deliver adhesive to a hinge of the MEMS device of FIG. 6.

Channel-forming members, such as the exemplary channel-forming member 77, can be used to deliver adhesive to a hinge of a MEMS device, such as the hinge 59 of the MEMS device 50 shown in FIG. 6. The channel-forming member 77, in conjunction with the support 48, provides a microchannel 79. A micron-sized drop of adhesive 90 placed at an end of the microchannel 79 will be drawn in the direction of arrow 92 through the microchannel and delivered to the hinge 59 at location 94. The hinge itself functions as a microchannel, spreading the adhesive in the direction of arrow 96 across the full hinge. For clarity, a single channel-forming member 77, microchannel 79 and hinge 59 are pictured in FIG. 7. It should be understood that such microchannels can be associated with each hinge of such a MEMS device.

Additionally, micron-sized drops of adhesive can be delivered to the notches 74 and 80 in respective hinged plates 70 and 76 to fix those plates to the frame 60 and fixed electrode 56.

Although specific embodiments of this invention have been shown and described herein, it is to be understood that these embodiments are merely illustrative of the many possible specific arrangements that can be devised in application of the principles of the invention. Numerous and varied other arrangements can be devised in accordance with these principles by those of ordinary skill in the art without departing from the scope and spirit of the invention.

We claim:

1. A method for making a microdevice on a support, comprising:

forming plates having hinges, the hinges rotatably attaching said plates to a surface of the support, wherein said plates, after formation, lie on the surface of the support;

forming a channel that leads from a first region of the support to a first hinge of one of said plates;

rotating the one plate away from the surface of the support about the first hinge;

delivering adhesive with a micropipette to said first region of the support, wherein the adhesive is applied as a first micron or smaller sized droplet; and conducting said adhesive from the first region to said first hinge via the channel.

2. The method of claim 1, wherein said adhesive is conducted from the first region to the first hinge via capillary action.

3. The method of claim 1, wherein the step of delivering adhesive further comprises:

drawing said adhesive into the micropipette;

positioning an orifice of said micropipette at said first region of the support;

developing a positive pressure in said micropipette to force a first droplet of adhesive therefrom.

4. The method of claim 1, wherein the step of forming plates further comprises forming first and second electrically-conductive plates, wherein said first electrically-conductive plate is rotatably attached, via a second hinge, to said surface of said support; and wherein said second electrically-conductive plate is rotatably attached to a third plate, said third plate being rotatably attached via a fourth hinge, to said surface of said support;

wherein the step of rotating further comprises:

rotating said first electrically-conductive plate away from the surface of the support about the second hinge; and fixing said first electrically-conductive plate in its rotated position;

rotating said third plate away from the surface of the surface of the support about the fourth hinge; and fixing said third plate in its rotated position;

wherein said second electrically-conductive plate is operable to move toward said first electrically-conductive plate upon application of a voltage across said and second electrically-conductive plates;

and further comprising applying a second droplet of adhesive on the order of ten microns to at least one of said first and second electrically-conductive plates at a location thereon that is suitable for preventing contact between said first and second electrically-conductive plates when voltage is applied.

5. The method of claim 4, wherein the step of forming plates further comprises:

forming a support plate that is rotatably attached, via a fifth hinge, to the surface of the surface, the support plate having a notch for engaging said first electrically-conductive plate;

wherein the step of rotating further comprises:

rotating said support plate away from the surface of the support about said fifth hinge;

wherein the step of fixing said first electrically-conductive plate comprises:

rotating said support plate until it engages said first electrically-conductive plate; and applying a third droplet of adhesive on the order of ten microns to the notch.

6. The method of claim 3, wherein the step of drawing further comprises developing a negative pressure in the micropipette.

7. The method of claim 3, wherein the step of drawing further comprises drawing an adhesive into the micropipette that develops a contact angle $\phi_1$ between the adhesive and an interior surface of the micropipette that is less than about 90°.

8. The method of claim 7, wherein the step of drawing further comprises drawing an adhesive into the micropipette that develops a contact angle $\phi_2$ between the adhesive and the first surface that is greater than zero and less than $\phi_1$.

9. The method of claim 8, wherein $\phi_1$ is about 60° and $\phi_2$ is about 30°.

10. The method of claim 7, and further comprising the step of coating an outer surface of the micropipette with a first material, wherein a contact angle $\phi_3$ between the adhesive and first material is greater than a contact angle $\phi_2$ between the adhesive and the first surface.

11. The method of claim 5, further comprising the step of exposing the first, second and third droplets of adhesive to UV light.

12. The method of claim 3, further comprising:

forming said micropipette such that said orifice has a diameter of less than about 100 microns.

13. The method of claim 1, wherein said channel is formed via a channel-forming member disposed on said surface of the support.

14. The method of claim 13, wherein said channel-forming member comprises a portion of said first hinge.

* * * * *